United States Patent [19]

Schneiter

[11] 4,068,230
[45] Jan. 10, 1978

[54] PASSIVE ELECTRO-OPTIC DISPLAY DEVICE

[75] Inventor: Ali Schneiter, Neuchatel, Switzerland

[73] Assignee: Ebauches S.A., Neuchatel, Switzerland

[21] Appl. No.: 734,552

[22] Filed: Oct. 21, 1976

[30] Foreign Application Priority Data

Oct. 28, 1975 Switzerland .................... 13973/75

[51] Int. Cl.² .......................................... G08B 5/00
[52] U.S. Cl. ........................ 340/378 R; 340/336; 340/378 B
[58] Field of Search ............... 340/378 R, 336, 378 A, 340/378 B; 40/137

[56] References Cited

U.S. PATENT DOCUMENTS

| 3,406,476 | 10/1968 | Wilcox | 40/137 |
|---|---|---|---|
| 3,468,545 | 4/1969 | Anderson | 40/137 |
| 3,903,519 | 9/1975 | Zega | 340/336 |
| 3,924,227 | 12/1975 | Stulov | 340/336 |

Primary Examiner—Harold I. Pitts
Attorney, Agent, or Firm—Silverman & Cass, Ltd.

[57] ABSTRACT

An electro-optic display device having an activable surface. The surface including several separately activable zones, each zone having at least two sets of parallel discrete elements imbricated one in another and each set also separately activable. By simultaneously activating several different sets of elements, at least two separate imbricated patterns or data may be displayed simultaneously. The separate patterns may be observed independently through a reticulated transparent screen which may be movable to display one pattern, then the other.

4 Claims, 2 Drawing Figures

PASSIVE ELECTRO-OPTIC DISPLAY DEVICE

BACKGROUND OF THE INVENTION

The present invention relates to a passive electro-optic display device comprising an activable surface.

SUMMARY OF THE INVENTION

The purpose of the present invention is to increase the "capacity" of such devices while furnishing means permitting on the one hand to display simultaneously at least two different patterns and on the other hand to observe only one of these patterns at the same time.

To this effect, the display device according to the invention is characterized by the fact that the said activable surface is constituted by several narrow rectangular zones separately activable on at least a portion of their length, the said activable surface being surmounted with a reticulated transparent screen the lines of the net of which are parellel to the said zones, this screen permitting, according the incidence under which it is observed, the observation of the activated zones, the whole in such a way that at least two different patterns, imbricated one in another, can be displayed simultaneously, and that one or the other of the said patterns be visible according to the incidence under which the reticulated screen is observed.

BRIEF DESCRIPTION OF THE DRAWINGS

The drawing shows, by way of example, one embodiment of the object of the invention.

DESCRIPTION OF THE PREFERRED EMBODIMENT

Figure 1:
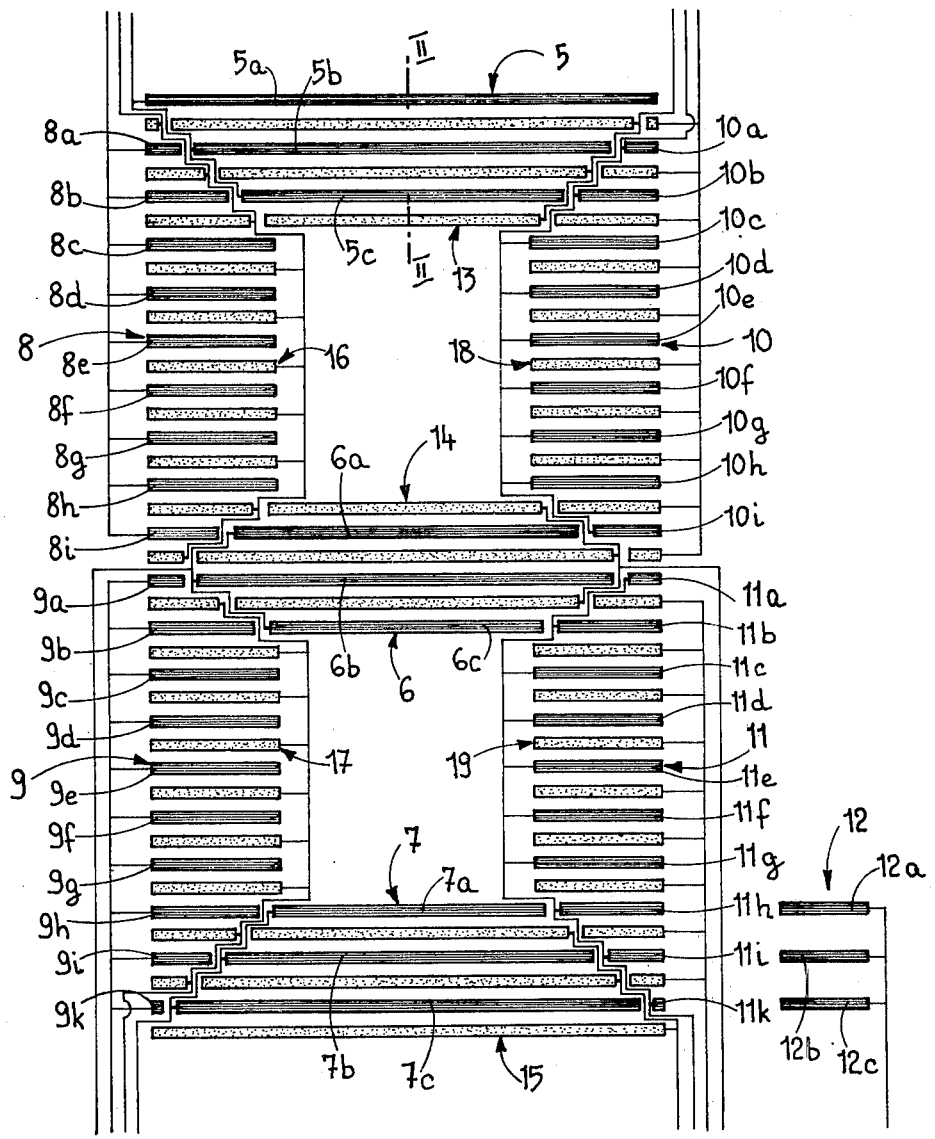
FIG. 1 is a plane view of a display device comprising an electro-optic cell.

The display device represented comprises two glass plates 1 ad 2 separated from each other by a frame 3, between which is disposed a liquid crystal 4. The front plate 1 carries electrodes, disclosed in detail hereafter, while the rear plaate 2 carries counter-electrodes, not represented, situated opposite the electrodes of plate 1.

Such passive electro-optic display cells being known per se, their operation will not be disclosed here in detail except for indicating that the only electrodes which are visible, by an effect of contrast, are the activated electrodes, that is to say the ones which show a difference of potential with respect to their counter-electrodes.

The display device disclosed and represented comprises a first set of seven electrodes, designated by 5, 6, 7, 8, 9, 10 and 11, constituting seven segments distributed according to a "8" shaped pattern, which permit the display of the data 0 to 9. An eighth electrode, designated by 12, constitutes a point.

Each of the above mentioned electrodes is itself constituted by several discrete elements formed by parallel lines, the number of which varies with the dimensions of the electrode, and which are designated by 5a to 5c for the electrode 5, by 6a to 6c for the electrode 6, by 7a to 7c for the electrode 7, by 8a to 8i for the electrode 8, by 9a to 9k for the electrode 9, by 10a to 10i for the electrode 10, by 11a to 11k for the electrode 11, and by 12a to 12c for the electrode 12.

The display device comprises moreover a second set of seven electrodes, designated by 13, 14, 15, 16, 17, 18 and 19, constituting seven segments also distributed as a "8" shaped pattern, which permit the display of the data 0 to 9.

Each of the second set of electrodes is itself constituted by several discrete elements, formed by parallel lines, the number of which varies with the dimensions of the electrode, which have not been provided with reference numerals in order not to overload the drawing, but which distinguish from the ones of the first set of electrodes by the fact that they have been represented by bars shaded with points while the elements of the first set have been represented by bars provided with parallel lines.

The discrete elements of each electrode of one set are parallel to these of the corresponding electrode of the other set, the elements of the two electrodes being moreover imbricated one in another. The discrete elements of each electrode are electrically connected one to each other.

Incidentally, it is to be noted that the several discrete elements of the electrodes constituting horizontal segments, i.e. electrodes 5, 6, 7, 13, 14 and 15, are parallel to these segments, which constitute their length, while the discrete elements of the electrode constituting vertical segments, i.e. electrodes 8, 9, 10, 11, 16, 17, 18 and 19, are perpendicular to these segments, which constitute their width.

Owing to the present arrangement, it is possible, while activating simultaneously some of the electrodes of the first set and some electrodes of the second set, to display simultaneously two different data, imbricated one in another.

So that these two data can be observed separately, the device comprises a reticulated transparent screen 20, situated in front of the front plate 1, provided with grooves which are parallel to the discrete elements constituting the electrodes.

Figure 2:
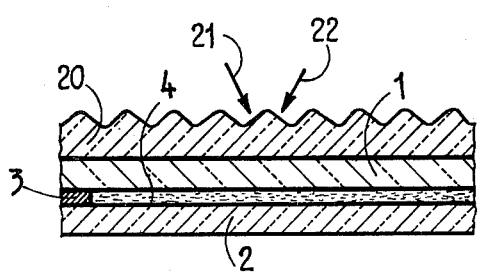
FIG. 2 is a detailed sectional view, along line II—II of FIG. 1, at a larger scale.

It results from this arrangement that, according to the incidence, indicated by the arrows 21 and 22 of FIG. 2, along which the observation is effected, the activated electrodes of one or the other of the two sets of electrodes are visible, that means that one or the other of the two displayed data is visible. It is to be noted that the point constituted by the electrode 12 appears only in one of the two positions of observation, the electrode 12 having not its homologue in the second set; this electrode thus constitutes a point of reference permitting to know what is observed. As a matter of fact, in the case of a timepiece, for instance, it can be admitted that one of the two positions gives the hours and the second the minutes, being understood that the first one is accompanied with a point while the second one is not.

It is to be noted that the point constituted by the electrode 12 could be replaced by a stationary pattern, of any shape, included as a text, appearing in one of the observation positions, imbricated in a different stationary pattern appearing in the other observation position, these two patterns constituting two references recalling to the user the signification of what he is observing. This indication could also be given by modifications of the appearance, especially of the color, of the ground of the display zone.

The present arrangement has the advantage of permitting to display, on a surface, multiple information without it being necessary to have any complicated electronic switching. Consequently, it will be specially useful in the case of the ladies watches in which one does not have room enough for three or four juxtaposed digits. It will also be useful in the case of solid states watches where the display device is situated on the same plane as the circuit which reduces the room available for the display. It will also be usable in the computers with memories, permitting the display of the information contained in the memory at the same time as other indications, without it being necessary to have the room occupied by a supplementary display device and without it being necessary to effect any manipulation for knowing the content of the memory.

As a modification, one could provide that the reticulated screen be movable and that, by the manipulation of a control member, one brings this screen into an observation position or into another one. The relief of the reticulated screen could be situated either at the eye-side, as disclosed and represented in the drawing, or on the contrary at the side of the display cells. This screen could be carried by the display device or by the glass of the watch or by the polarizer of the cell in the case of a liquid crystal cell with field effect. Likely, the reticulated screen could be made of one piece with the front plate of the cell.

It is to be noted that the present arrangement could also be applied not to the display of data, as in the example disclosed and represented, but to the display of any pattern, stationary or changing, as for instance in television art where two programs could be displayed simultaneously.

What I claim is:

1. Passive electro-optic display device including an activable surface adapted to be observed through a reticulated transparent screen including a net having parallel lines permitting observation of different areas according to the incidence of observation of said screen, said device comprising:

means for simultaneously displaying at least two different imbricated patterns on said activable surface, said means including said surface having several separately activable zones, each zone including at least two separate sets of discrete elements, the elements of each set alternating with those of the other set, each set of elements also being separately activable, and each element being parallel with one another.

2. Display device as claimed in claim 1 wherein:
said activable surface includes a cell having two plates between which is arranged an active constituent, one plate being provided with electrodes while the second plate is provided with counter-electrodes disposed opposite of said electrodes, only said electrodes which are activated being visible;
each set of said discrete elements being one electrode;
one of said plates including reticulated transparent screen means mounted thereon, having a net with lines parallel to said discrete elements, for observing only the elements of one of said sets of elements at a time depending upon the incidence of the observation.

3. Display device as claimed in claim 2 wherein:
said screen means include means for moving it into one of at least two different observation positions, one of said patterns being observable in each position.

4. Display device as claimed in claim 1 further including:
means for signifying which of said imbricated patterns is being observed, through reticulated transparent screen means, said signifying means including a third stationary imbricated pattern visible in at least one incidence of observation.

* * * * *